(12) United States Patent
Wachtel

(10) Patent No.: US 6,709,198 B2
(45) Date of Patent: *Mar. 23, 2004

(54) IRRIGATION SYSTEM AND METHOD

(75) Inventor: Boaz Wachtel, Even Yehuda (IL)

(73) Assignee: International Water & Energy Savers, Ltd., Even Yehuda (IL)

( * ) Notice: Subject to any disclaimer, the term of this patent is extended or adjusted under 35 U.S.C. 154(b) by 0 days.

This patent is subject to a terminal disclaimer.

(21) Appl. No.: 10/044,342

(22) Filed: Oct. 26, 2001

(65) Prior Publication Data

US 2002/0141828 A1 Oct. 3, 2002

Related U.S. Application Data

(63) Continuation-in-part of application No. 09/503,587, filed on Feb. 14, 2000, now Pat. No. 6,419,422.

(51) Int. Cl.$^7$ ........................... F25D 31/00; A01G 25/00
(52) U.S. Cl. ............................. 405/36; 405/51; 405/56; 47/1.01 F; 165/45; 62/260
(58) Field of Search ............................. 405/36, 51, 56, 405/59, 130; 47/1.01 F; 165/45; 62/260; 138/DIG. 11

(56) References Cited

U.S. PATENT DOCUMENTS

| 661,944 A | 11/1900 | Belden ........................ 62/289 |
| 1,318,210 A | * 10/1919 | Boiteaux ..................... 138/38 |
| 1,442,367 A | 1/1923 | Stevens .................... 47/1.01 R |
| 3,498,077 A | 3/1970 | Gerard et al. ................. 62/260 |
| 3,675,442 A | 7/1972 | Swanson ..................... 62/285 |
| 3,890,740 A | 6/1975 | Miller ..................... 47/1.01 R |
| 4,065,926 A | 1/1978 | Brandt ........................ 405/36 |
| 4,087,893 A | * 5/1978 | Sata et al. ............. 29/890.032 |
| 4,315,599 A | 2/1982 | Biancardi ..................... 239/10 |
| 4,348,135 A | 9/1982 | St. Clair ...................... 405/36 |
| 4,351,651 A | 9/1982 | Courneya .................... 165/111 |
| 4,459,177 A | 7/1984 | O'Hare ........................ 203/10 |
| 4,577,435 A | 3/1986 | Springer et al. ................. 47/2 |
| 5,368,092 A | 11/1994 | Rearden et al. ............... 165/45 |
| 5,598,661 A | 2/1997 | Eiderman et al. .............. 47/27 |
| 5,842,813 A | 12/1998 | Auvinen ...................... 405/36 |
| 6,148,559 A | 11/2000 | May ........................ 47/1.01 F |

FOREIGN PATENT DOCUMENTS

| DE | 3830647 | 3/1990 |
| WO | WO 98/33372 | 8/1998 |

OTHER PUBLICATIONS

Hazardous Substnaces Data Bank, Chronic Toxicology Summary: Ethylene Glycol, 1996.*

* cited by examiner

Primary Examiner—Robert E. Pezzuto
Assistant Examiner—Tara L. Mayo
(74) Attorney, Agent, or Firm—Armstrong, Kratz, Quintos, Hanson & Brooks, LLP

(57) ABSTRACT

An irrigation system comprising a closed-loop piping system, a portion of which is a condensing section extending on or below ground surface, and at least another portion of which is a cool-collecting section buried under ground at a cool ground zone. The closed-loop piping holds a liquid which is propelled by a circulating system through the piping system. The liquid is chilled by heat exchanging at the cool ground zone and then flows to the condensing section where moisture from the vicinity is extracted by condensation over the condensing section. The moisture is readily available for consumption by agriculture growth.

25 Claims, 6 Drawing Sheets

IRRIGATION SYSTEM AND METHOD

RELATED APPLICATIONS

The present application is a continuation-in-part of U.S. application Ser. No. 09/503,587 filed Feb. 14, 2000, now U.S. Pat. No. 6,419,422.

FIELD OF THE INVENTION

The present invention is generally in the field of irrigation and more specifically it is concerned with a method and system for irrigation by condensation.

BACKGROUND OF THE INVENTION

There is always a demand for fresh irrigation of water and there occurs particular problems in remote country areas which lack sufficient resources of fresh water and where supply and water by pipes is costly owing to extreme distances requiring substantially long pipes and power supplies for pumping stations etc.

Various solutions are provided for that purpose, such as desalination of sea water, capturing flood water, exploiting underground aquifers etc. However, these methods of supplying irrigation water have one or more of several drawbacks such as providing water at poor quality not suitable for agriculture, high cost and low efficiency, high wear of equipment, dependency upon precipitation, etc.

Other arrangements provide recovering moisture from air masses, typically by various condensation methods. These arrangements are usually highly costly and of questionable efficiency. Some particular examples provide limited solutions adjacent coastal zones wherein deep ocean water at significantly low temperature may be pumped for recovering of fresh water by condensation.

Some of the prior art patents concerning recovering of fresh water from the moist in the air are the following U.S. Pat. Nos. 661,944, 3,498,077, 3,675,442 and 4,459,177.

U.S. Pat. Nos. 1,442,367, 3,890,740, 4,577,435 and 6,148,559 are all concerned with prebudding control methods and apparatuses which achieve such control by governing the temperature of the agricultural growth.

It is an object of the present invention to provide an irrigation system for recovering water from moisture contained in the soil or air by condensation over pipes buried in the soil at a depth corresponding with depths of roots of agriculture growth or laid on the ground. The term "adjacent ground surface" will be used to denote laying the piping system either or both upon the ground surface or below ground surface, as denoted above.

The term underground is used to denote that the piping is received within any media suitable for agriculture growth, wherein the pipes are received within said media. In case of an artificial soil bedding this term may be understood also as in-ground, depending on the context. Herein the specification and claims, the terms ground and soil are interchangeably used to denote the growing media.

SUMMARY OF THE INVENTION

According to a first aspect of the present invention there is provided an irrigation system comprising an energized cooling system for cooling a liquid to a temperature below ground temperature, closed-loop placed on or adjacent below ground surface and an energized liquid circulating arrangement for circulating the liquid through the system, whereby propelling the cooled liquid through the piping extracts moisture from the environment (air and soil) by condensation over the piping, for consumption by agriculture growth in the vicinity of the piping. By an embodiment of the invention, substantial portions of the piping may be laid on the ground.

The term closed-loop denoted a system wherein substantially there is no loss of liquid to the environment.

In order to increase overall thermal efficiency, one or more components of the system are buried under ground for reducing heat loss during hot hours of the day. In some cases it might be advantageous to provide additional cooling systems for increasing performances of the system.

Typically, the cooling system includes heat exchanger arrangements for cooling the liquid.

The system can be a so-called stand alone irrigation system, or it may be used as a co-existing system along with a conventional irrigation system, where each of the systems may be selectively used.

The liquid circulating arrangement and the cooling system may be energized by a variety of energy sources such as, solar energy supply, wind energy, electric energy (main supply, generators, etc,), hydraulic energy, biomass energy and source of natural cold water.

In order to increase the amount of liquid recovered by condensation, the piping may be inert with increased section area as compared with a pipe having a circular cross-section. This is possible by forming the piping with indentations or serrated sheath surface, increasing the effective surface of the piping which is in contact with the ground.

Typically, a control system is provided for retaining a substantially constant $\Delta T$ by regulating liquid temperature where:

$$\Delta T = T_g - T_1$$

$T_g$ = ground temperature measure at the vicinity of the piping;
$T_1$ = liquid temperature running through the piping, and where $T_1 > 0$.

The control system is utilized also for governing flow parameters and operative patterns of the irrigation system, e.g. sensing the humidity of the soil or ambient air at different hours of the day in order to recover maximum condensation liquid, determining hours of the day during which the liquids in the system is at its minimal temperature, etc.

In accordance with a second aspect of, the present invention there is provided a method for underground irrigation according to which a liquid is propelled at a temperature below ground temperature, through a closed piping system buried below ground surface, thereby condensing liquid over the piping sheath for consumption by agriculture growth in the vicinity of the piping.

In accordance with the irrigation method of the invention, the piping is connected to a liquid reservoir, a circulating arrangement and a cooling system for chilling the liquid.

In accordance with another aspect of the invention the irrigation system comprises an irrigation system comprising a closed-loop piping system of which at least a portion of which is a condensing section extending on or adjacent below ground surface, and at least another portion of which is a cool-collecting section buried under ground at a cool ground zone; said closed-loop piping holding a liquid which is propelled by a circulating system fitted along the piping system; whereby said liquid is chilled by heat exchanging at the cool ground zone and then flows to the condensing section where moisture from the vicinity is extracted by condensation over condensing section readily available for consumption by agriculture growth.

The term "cool ground zone" as used herein in the specification refers to a level under ground wherein the mean soil temperature remains essentially constant in spite decrease in depth This zone is at a depth at which temperature differences are minor. The arrangement in accordance with this application is such that the liquid at the cool-collecting section is chilled by the soil which is significantly cooler than ambient air temperature and as the chilled liquid reaches the condensing section, it causes condensation over sheets of the piping at the condensing section, extracting moisture from the environment which is then to be consumed by the growth.

Where the ambient relative humidity is low, a cooling system may be incorporated with the irrigation system, to thereby reduce the temperature of the liquid within the piping for improving condensation performances.

Typically there is provided a control system in association with the irrigation system for determining the due point temperature which is the temperature at which the chilled liquid flowing within the condensing section must reach and the ambient temperature surrounding the condensing section, for moisture to form on sheets of the piping.

The liquid flowing through the piping is at essentially constant pressure.

An irrigation system in accordance with an embodiment of the invention is arranged such that the piping system comprises several condensing sections and several cool-collecting sections; said cool-collecting sections being arranged in altering depths to thereby minimize heat transfer influence between adjoining sections.

BRIEF DESCRIPTION OF THE DRAWINGS

For better understanding the invention and to exemplify how it may be carried out in practice, the invention will now be described with reference to the accompanying drawings in which.

DETAILED DESCRIPTION OF SPECIFIC EMBODIMENTS

Figure 1:
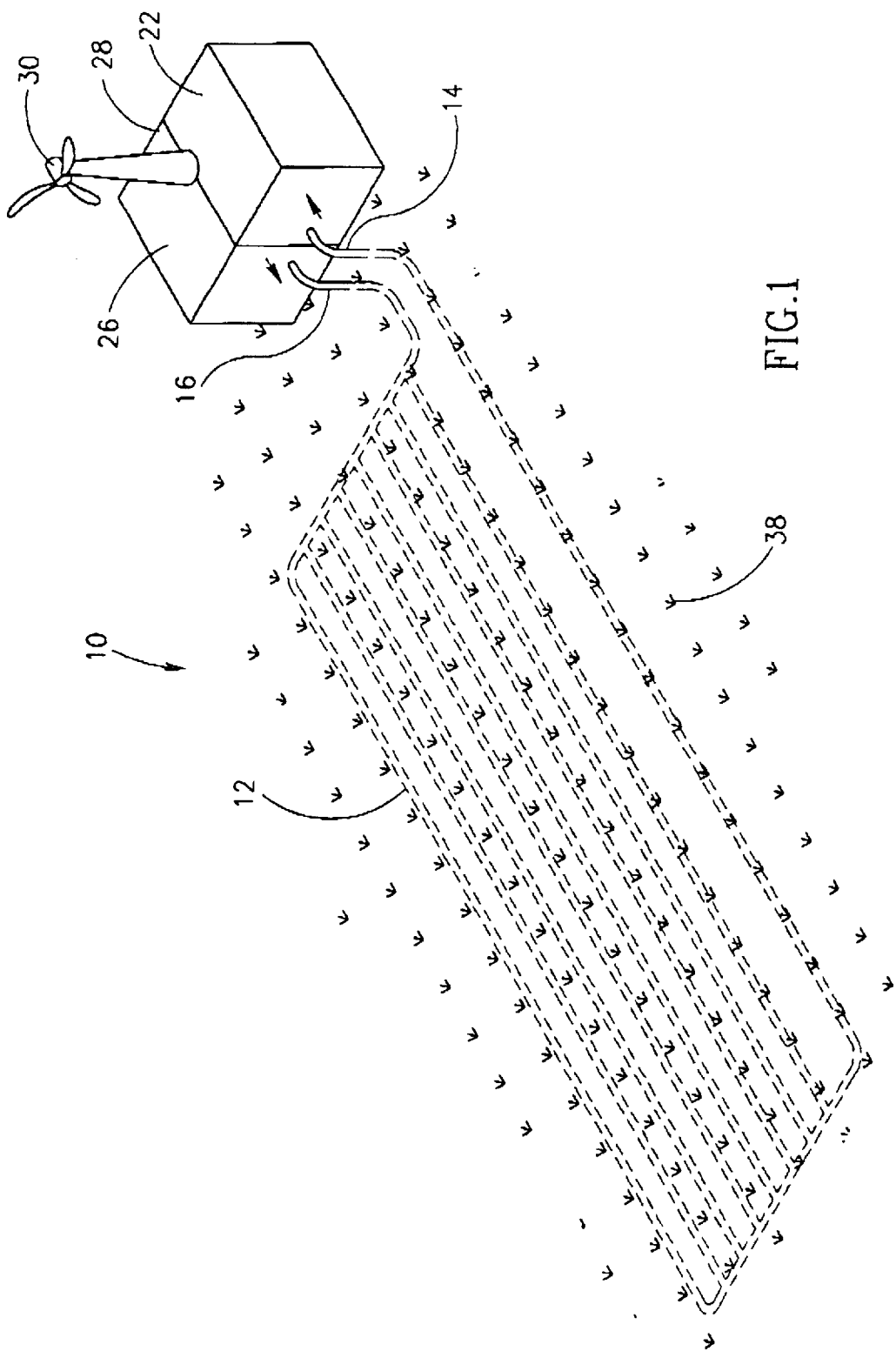
FIG. 1 is a schematic illustration of a first embodiment of the invention.

Attention is first directed to FIG. 1 of the drawings illustrating the irrigating system generally designated 10 wherein a closed loop of piping 12 is buried under ground surface, e.g. at a depth of between about 5 to 20 cm, with an inlet end 14 and an outlet end 16. Where the piping is buried the actual depth of the piping should correspond with the depth of roots of a respective agriculture growth. However, it is to be appreciated that the piping may be laid on the ground surface. As already mentioned above, the ground may also be a soil bedding of any type wherein the piping is received within the bedding. By a modification of the invention, the piping may be laid on ground surface (not shown).

Inlet 14 is connected to a cooling system 22 whilst outlet 16 is connected to a circulating pumping arrangement 26. In the present example cooling system 22 and pumping system 26 are received in a common housing 28 with a wind-operated electric supply system generally designated at 30 energizing both the cooling system 22 and the circulating pump 26. It will be however appreciated that each of cooling system 22 and circulating pump 26 may be located at any location of the plant with a common energizing system in accordance with the present example or separate ones.

Figure 3A:
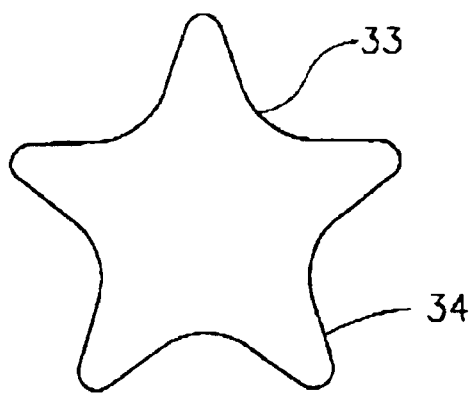
FIGS. 3A and 3B are cross-sections of different embodiments of a pipe for use with a system according to the invention.
Figure 3B:
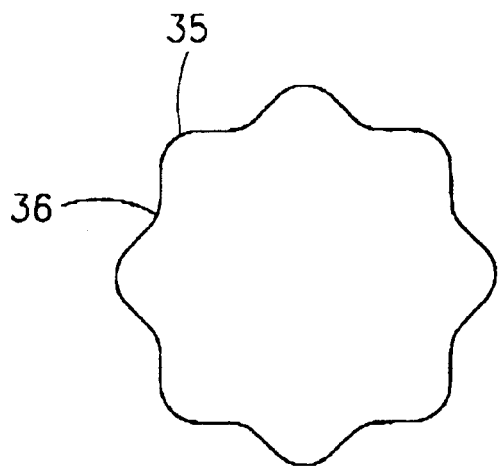

The piping 12 may be made of simple plastic or any other material which provides increased condensation thereabout as known per se. Typically, the piping is buried at a depth which corresponds to the root depth of a specific growth planted in the site. In order to improve condensation, the area of contact of the piping with the soil may be increased by providing piping 33 with increased sheath area having a cross-sectional shape formed with a plurality of axial projections 34 (FIG. 3A) or a piping 35 formed plurality of axial indentations 36 (FIG. 3B).

When fluid, typically a liquid such as water, is cooled in the cooling system 22 and is then circulated through piping 12 by means of circulating pump 26 (if required, several circulating pumps may be fitted in the system), thermal gradient develops between the soil and the sheath of the piping 42, resulting in condensation induced around the piping, whereby the humidity of the soil in the vicinity of the piping is converted into liquid available for consumption by the roots of the plants 38.

It is known that cold water agriculture yields crops having rapid growth, high yield with high sugar and aromatic content of the fruits and vegetables.

Figure 2:
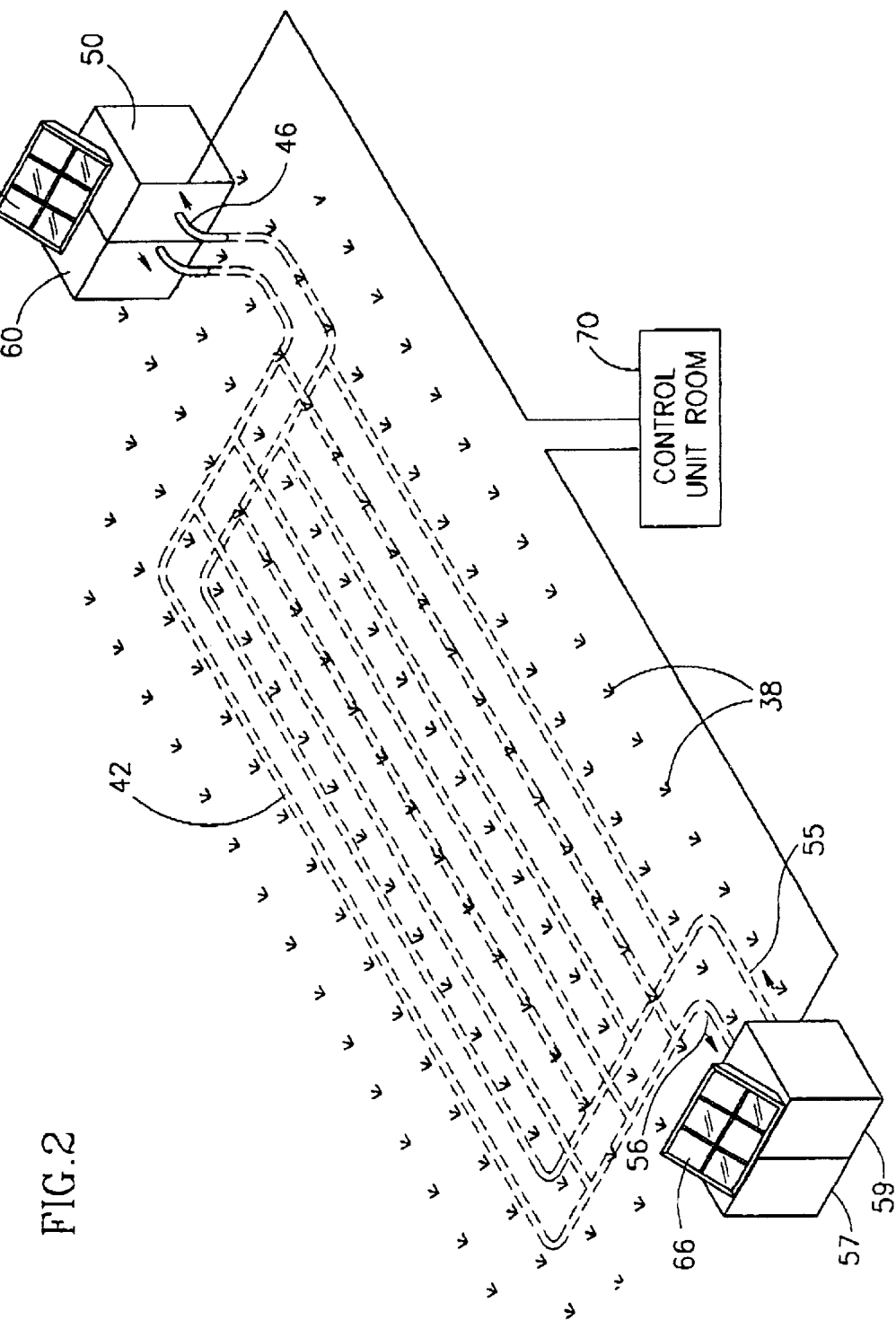
FIG. 2 is a schematic illustration of another embodiment of an invention in accordance with the present invention.

Further attention is now directed to FIG. 2 illustrating a modification of the previous embodiment wherein the piping 42 is buried under ground level, as in accordance with the previous embodiment, wherein the piping 42 is connected at a first inlet 46 to a first cooling system 50 with a second inlet 55 and outlet 56 connected to a second cooling system 57 positioned at a remote end of the irrigated field or at any suitable location, thereby obtaining improved thermal efficiency of the system. A pumping unit 60 is incorporated in the same housing as the first cooling system 50 and a second pumping unit 59 is incorporated in the same housing as the second cooling system 57 whereby respective solar panels 64 and 66 supply the required electric power for energizing the cooling systems and the circulating pump units, respectively.

Further seen in the embodiment of FIG. 2 there is a control unit generally designated 70 which is schematically represented and which comprises a variety of control means receiving different inputs such as liquid temperature within piping 42, inlet and outlet temperature at the cooling systems 50 and 54, soil temperature in the vicinity of the piping, relative humidity in the soil, precipitation (rain, dew, etc.) According to the data received, the control unit 70 emits operating signals to operate or cease operation of the system, pumping rate, temperature of liquid at the cooling system outlet, etc.

Figure 4A:
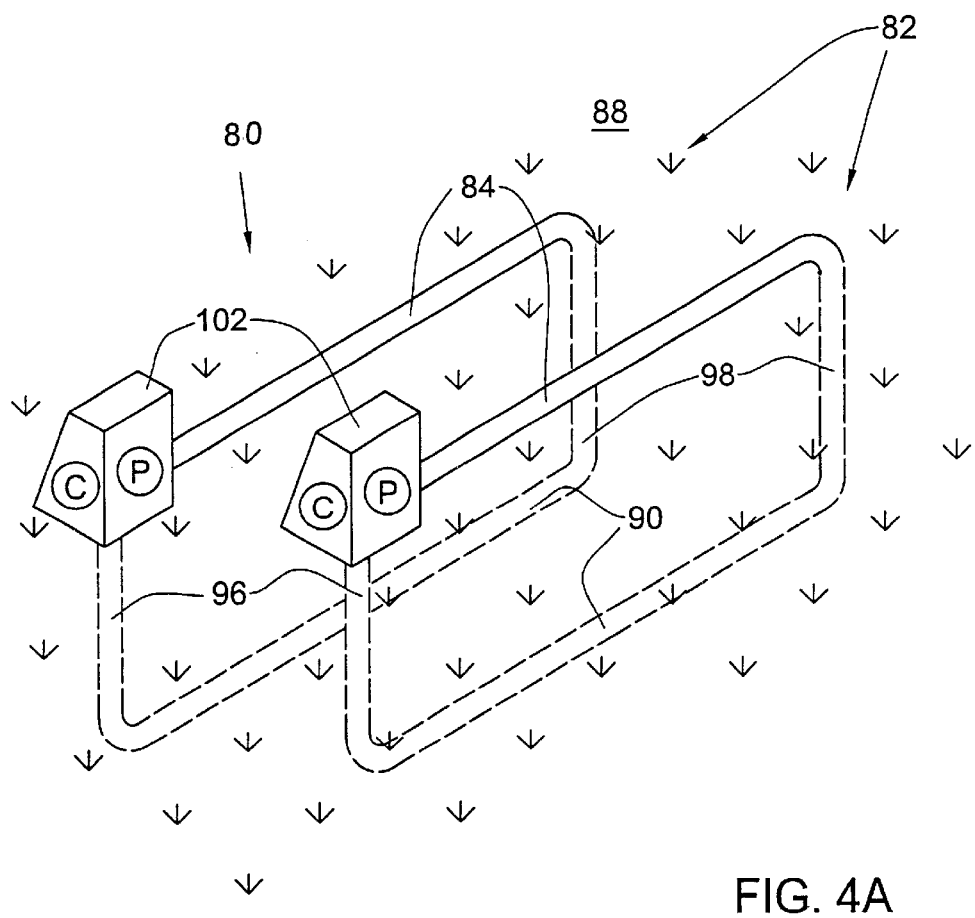
FIG. 4A is a schematic isometric representation of an irrigation system in accordance with a modification of the invention.
Figure 4B:
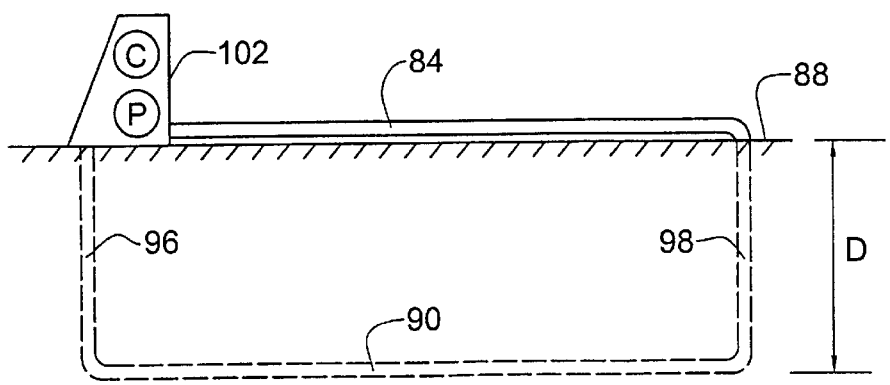
FIG. 4B is a side elevation of the embodiment seen in FIG. 4B.

Attention is now directed to FIGS. 4A and 4B illustrating an irrigation system in accordance with a modification of the invention generally designated 80. Irrigation system comprises two or more parallel closed loop piping systems 82, each having a condensing section 84 extending above or adjacent below ground surface 88, and a cool-collecting section 90 ascending deep under ground surface at a depth D (FIG. 4). The depth D is typically greater then 1 meter, which is considered a cool ground zone. The condensing section 84 and the cool-collecting section 90 are in flow communication via tube sections 96 and 98 which together constitute a closed loop piping 82. A control station 102 comprising a circulation system typically a pump P and optionally also a control system designated-C which will he specified hereinafter. Circulating system P may be a regular liquid propelling pump which may be energized by different known means, e.g. electric, wind, petrol, biomass, solar, etc.

The depth D at which the cool-collecting section 90 extends, referred to as the "cool ground zone", is selected at a depth such that the soil temperature remains around an average value which is substantially cooler than mean air temperature. Determining the soil temperature as it varies with time and depth may be carried out by different means, using different mathematical models as can be calculated for example in the Website of the Intermountain Resource-Inventories, Inc. at http//soilphysics.okstate.edu/toolkit/temperature/index0.html.

Arrangement is such that a liquid flowing through the piping 82 is chilled at the cool-collecting section 90 and when it reaches the condensing section 84, owing to temperature difference with ambient temperature, moisture is formed on the sheath of the condensing section 84.

Whilst in the figures the condensing section 84 is located right above ground surface 88, it is to be appreciated that rather the condensing section may be positioned at a short distance below ground surface, e.g. several centimeters below ground surface at a level corresponding with the level of roots of the agriculture growth.

Even more so, an advantage of the irrigation system in accordance with the invention that the cold liquid flowing through the condensing section has positive influence on the crops as known per se. Even more so, the system has an additional benefit in that during winter time, in case of frost on the ground, liquid flowing through the system does not freeze as the temperature at the cool ground zone remains above freezing point and accordingly, liquid flowing through the condensing section may prevent frost and damage of the growth.

Figure 5A:
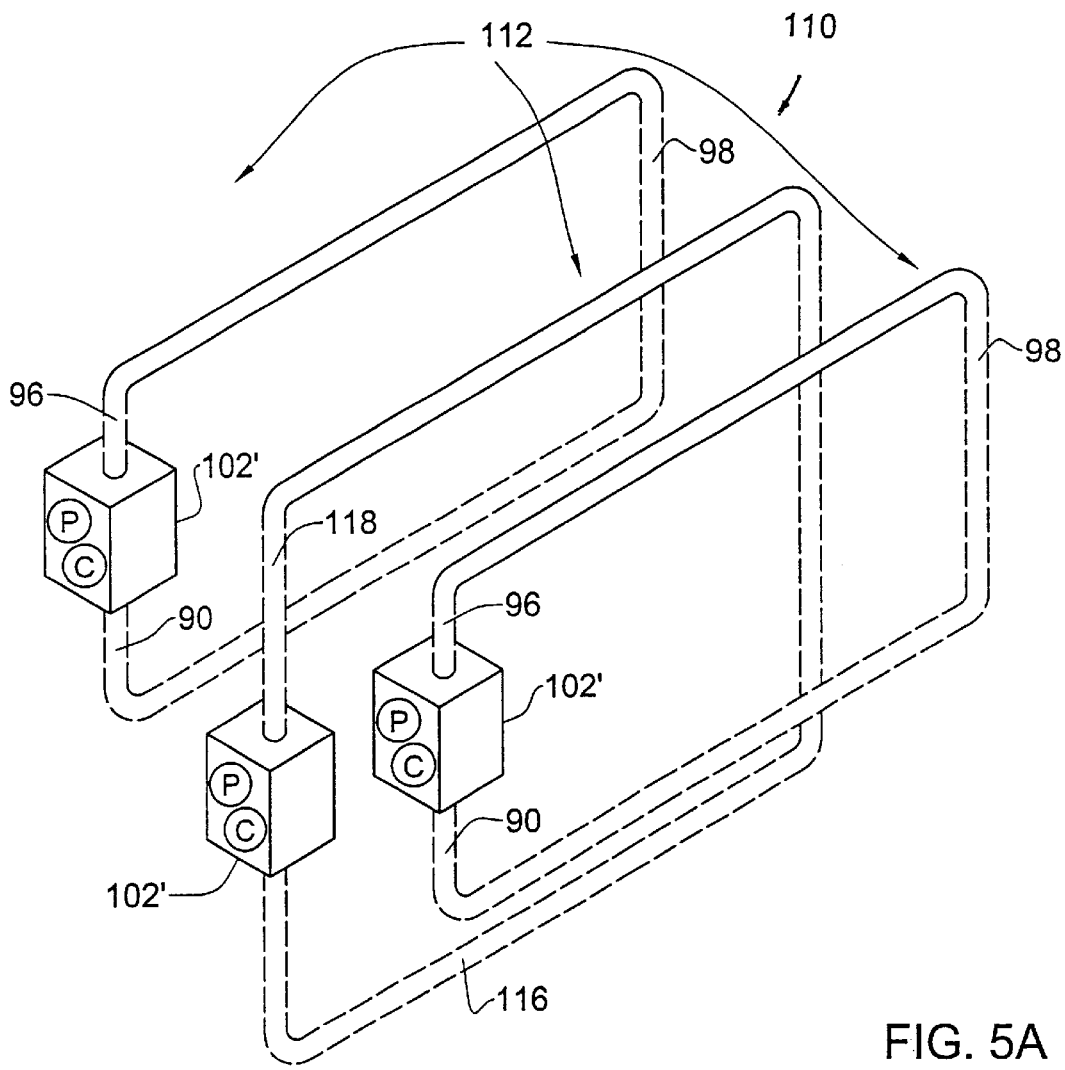
FIG. 5A is a schematic isometric representation of a further embodiment of an irrigation system in accordance with the invention.
Figure 5B:
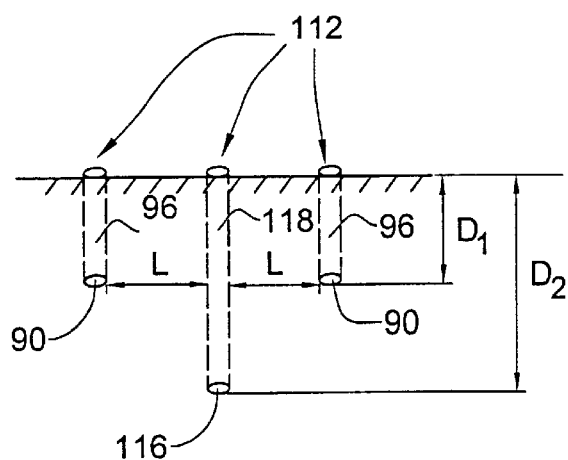
FIG. 5B is a side elevation of FIG. 5A.

Further attention is now directed to FIG. 5A and FIG. 5B illustrating a particular lay out of an irrigation system in accordance with the present invention in which like components as in the embodiment of FIGS. 4A and 4B are designated like reference numbers.

The system 110 comprises three closed loop piping systems 112 each having a condensing section 84 (to be laid on ground surface or adjacent below) and cool-collecting sections, two of which designated 90 extending at a first depth D1 (best seen in FIG. 5B) and an intermediate cool-collecting section 116 extending at a deeper level D2 whereby the connecting tube sections 118 is necessarily longer than corresponding portion 96 on the adjoining piping systems. The piping systems 112 are laterally spaced apart by a distance L (FIG. 5B) and each system is provided with a control unit 102' which has a similar function as in the embodiment of FIGS. 4A and 4B but is buried under ground surface, e.g. for minimal space consuming, for temper preventing and for retaining it at a temperature below ambient temperature.

The arrangement of FIGS. 5A and 5B is useful to ensure that the cool-collecting sections 90 and 116 are sufficiently remote from one another so as to minimize heat transfer between the adjoining sections.

Figure 6:
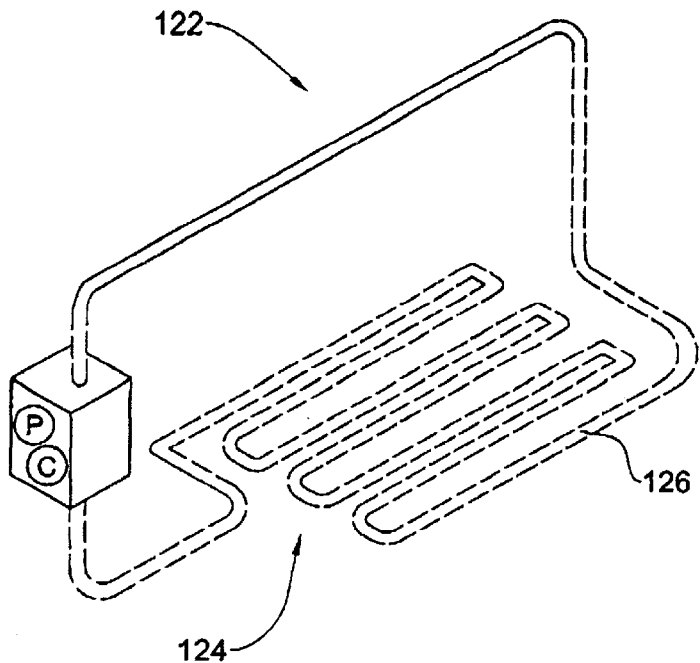
FIG. 6 is a schematic isometric view illustrating an irrigation system in accordance with an embodiment of the invention wherein the cool-collecting section is fitted with a heat exchanger.

In the embodiment of FIG. 6, there is illustrated an irrigation system 122 which is principally similar to the previous embodiments, the difference residing in that the cool-collecting system 124 comprises a heat exchanging unit 126 e.g. in the form of a plurality of looped pipes or a structure provided with fins for increasing heat exchange with the soil so as to rapidly cool the liquid flowing through that section.

Figure 7:
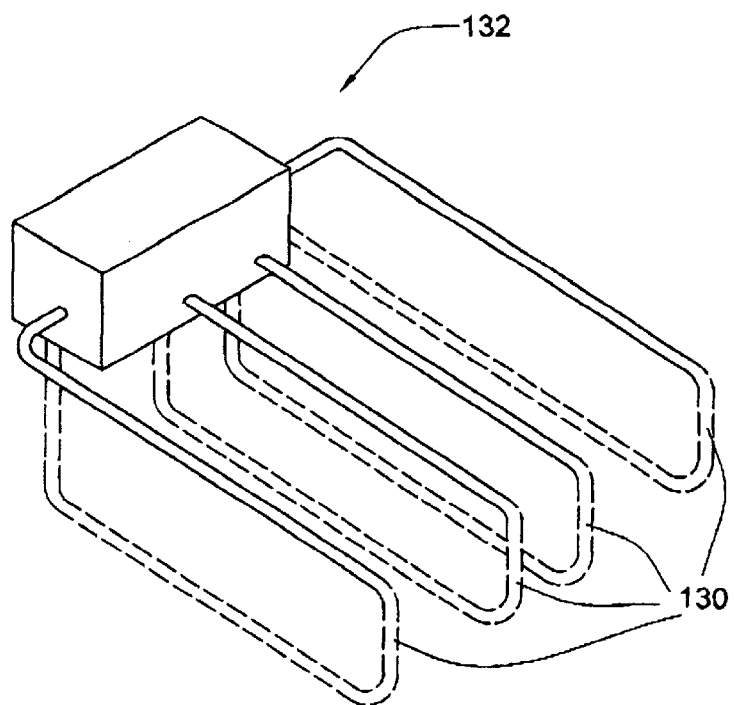
FIG. 7 is a schematic representation of an irrigation system figured with a central control unit.

In the embodiment of FIG. 7, there is provided an irrigation system comprising several closed loop piping systems 130 which rather than each being provided with an independent pump, there is a central control unit 132 provided with a controlling mechanism and a pump unit for selectively circulating liquid through each of the closed loop piping systems 130 at intervals, e.g. depending upon cooling rate of the liquid at the cool-collecting system, etc.

While preferred embodiments of the invention have been exemplified, it should be clear that it is not intended thereby to limit the disclosure of the invention, but rather it is intended to cover all modifications and arrangements falling within the scope and spirit of the present invention, mutatis mutandis.

For example, different layout of cooling system and pumping units may be set up, depending on topographic conditions, etc. Furthermore, the energizing power for a system in accordance with the present invention may be any suitable system such as, for example, solar, wind, electric, hydraulic, biomass, etc.

What is claimed is:

1. An irrigation system comprising an energized cooling system for controlling a liquid to a desired temperature, said system comprising:
    a closed-loop condensation piping placed on or below ground surface;
    an energized liquid circulating arrangement for circulating the liquid through the system; and
    a control system receiving inputs from within and without the irrigation system suitable for regulating the temperature of the liquid circulating through the irrigation system and
    retaining a substantially constant temperature difference $\Delta T$ between the ground temperature and the liquid temperature, where:

$$\Delta T = T_g - T_1$$

$T_g$ is the ground temperature measured at the vicinity of the piping;
    $T_1$ is the liquid temperature circulating through the condensation piping, and where $T_1 > 0°$ Centigrade, said temperature of the liquid is selected so as to prevent freezing of a ground zone in the vicinity of the piping;
    whereby the temperature difference is set at a level which allows extracting moisture from the environment by condensation over the piping, for consumption by agriculture growth in the vicinity of the piping.

2. An irrigation system according to claim 1, wherein a liquid reservoir is provided.

3. An irrigation system according to claim 2, wherein at least the liquid reservoir is placed under ground.

4. An irrigation system according to claim 1, wherein the cooling system includes heat exchanger arrangements.

5. An irrigation system according to claim 1, wherein either the liquid circulating arrangement or the cooling system is energized by an energy supplied by at least one of the following energy sources: solar, wind, electric, hydraulic and biomass energy source.

6. An irrigation system according to claim 1, wherein the piping is formed with increased section area for increasing the amount of liquid condensed on a sheath thereof as compared with a piping having a circular cross-section.

7. An irrigation system according to claim 6, wherein the piping has an indented or serrated sheath area.

8. An irrigation system according to claim 1, wherein the control system governs flow parameters of the liquid and operative parameters of the irrigation system.

9. An irrigation system according to claim 1, wherein the cooling system comprises one or more cooling units.

10. The irrigation system of claim 1, wherein the closed loop condensation piping has at least one pipe disposed on the ground surface and at least one parallel pipe disposed below the ground surface such that the at least one pipe on the ground surface is used as a source of irrigation by condensation of water and the at least one pipe disposed below the ground surface chills the roots of agricultural growth.

11. The irrigation systems of claim 1, wherein the liquid temperature is warmer than an external environmental temperature such that the agricultural growth is protected against frost.

12. A method for underground irrigation according to which a liquid is propelled at a temperature of the liquid, which is set below ground temperature, said liquid is propelled through a closed piping buried below ground surface, wherein said temperature of the liquid is set to allow extracting moisture from the environment by condensing the liquid over a sheath of the piping, wherein said temperature of the liquid is selected so as to prevent freezing of a ground zone at the vicinity of the piping and said moisture is available for consumption by agriculture growth in the vicinity of the piping.

13. An irrigation method according to claim 12, wherein the piping is connected to a liquid reservoir, to a circulating arrangement and to a cooling system for chilling the liquid propelled through the piping.

14. An irrigation method according to claim 12, in which a substantially constant temperature difference $\Delta T$ between the liquid temperature and the ground temperature is retained by regulating the liquid temperature, where:

$$\Delta T = T_g - T_1$$

$T_g$ is the ground temperature measured at the vicinity of the piping;

$T_1$ is the liquid temperature circulating through the piping, and where $T_1 > 0°$ Centigrade, said temperature of the liquid is selected so as to prevent freezing of a ground zone in the vicinity of the piping.

15. An irrigation system comprising a closed-loop piping system at least a portion of which is a condensing section extending on or below ground surface, and at least an other portion thereof being a cool-collecting section buried under ground at a cool ground zone, where the ground temperature remains substantially cooler than the mean air temperature; said irrigation system is provided with a circulating system suitable for propelling a liquid through the piping system; whereby said cool-collecting section is adapted for chilling the liquid by heat exchanging at the cool ground zone without however freezing of the cool ground zone, the arrangement being such that when the chilled liquid flows to the condensing section a moisture from the vicinity of the condensing section is extracted by condensation over the condensing section, said moisture is readily available for consumption by agriculture growth.

16. An irrigation system according to claim 15, wherein the cool-collecting section is buried at least one meter under ground surface.

17. An irrigation system according to claim 15, wherein the cool-collecting section is buried at or below a depth at which the temperature difference between the ground temperature and the main air temperature remains substantially constant.

18. An irrigation system according to claim 15, wherein the liquid comprises an anti-freeze agent, to thereby decrease the freezing point of the liquid.

19. An irrigation system according to claim 15, wherein the piping system comprises several condensing sections and several cool-collecting sections; said cool-collecting sections being arranged in altering depths to thereby minimize heat transfer influence between adjoining sections.

20. An irrigation system according to claim 15, wherein the cool-collecting section comprises a heat exchanger arrangement for increasing heat exchange rate.

21. An irrigation system according to claim 15, wherein several closed-loop piping systems are connected via a flow control valving system to the circulating system.

22. An irrigation system according to claim 15, further comprising a control system for activating the circulating system only when the temperature of the cool ground zone is below a predetermined temperature value at the vicinity of the condensing section.

23. An irrigation system according to claim 22, wherein the control system comprises:

a controller connected to the circulating system, a ground temperature sensing means for sensing temperature at the cool-collecting section and, an ambient temperature sensing means for sensing temperature at the condensing section, wherein said ground temperature sensing means and said ambient temperature sensing means generate corresponding temperature signals which are processed by the controller to generate an activating signal to the circulating system, whenever the cool ground zone is below the predetermined temperature value measured at the vicinity of the condensing section.

24. An irrigation system according to claim 23, wherein the ground temperature sensing means and the ambient temperature sensing means is suitable for sensing either or both liquid temperature and temperature at the vicinity of the condensing section.

25. A method for irrigation comprising:

propelling a liquid through a closed-loop piping system comprising at least a condensing section extending on or below ground surface, and at least a cool-collecting section buried under ground at a cool ground zone where the ground temperature remains substantially cooler than the mean air temperature;

chilling said liquid at the cool-collecting section without however freezing of the cool ground zone, extracting of moisture from the vicinity of the condensing section by condensation over a sheath at the condensing section, said moisture being readily available for consumption by agriculture growth.

\* \* \* \* \*